US012388617B2

(12) United States Patent
Soriente et al.

(10) Patent No.: US 12,388,617 B2
(45) Date of Patent: Aug. 12, 2025

(54) PRIVATE ARTIFICIAL NEURAL NETWORKS WITH TRUSTED EXECUTION ENVIRONMENTS AND QUADRATIC HOMOMORPHIC ENCRYPTION

(71) Applicant: NEC Laboratories Europe GmbH, Heidelberg (DE)

(72) Inventors: Claudio Soriente, Heidelberg (DE); Dario Fiore, Pozuelo de Alarcon (ES)

(73) Assignee: NEC CORPORATION, Tokyo (JP)

( * ) Notice: Subject to any disclaimer, the term of this patent is extended or adjusted under 35 U.S.C. 154(b) by 31 days.

(21) Appl. No.: 18/280,966

(22) PCT Filed: May 19, 2021

(86) PCT No.: PCT/EP2021/063353
§ 371 (c)(1),
(2) Date: Sep. 8, 2023

(87) PCT Pub. No.: WO2022/199861
PCT Pub. Date: Sep. 29, 2022

(65) Prior Publication Data
US 2025/0030536 A1 Jan. 23, 2025

(30) Foreign Application Priority Data
Mar. 25, 2021 (EP) .................................... 21164884

(51) Int. Cl.
*H04L 29/06* (2006.01)
*G06N 3/084* (2023.01)
(Continued)

(52) U.S. Cl.
CPC ............ *H04L 9/008* (2013.01); *G06N 3/084* (2013.01); *H04L 9/3073* (2013.01)

(58) Field of Classification Search
None
See application file for complete search history.

(56) References Cited

U.S. PATENT DOCUMENTS

2009/0279694 A1* 11/2009 Takahashi .............. G06F 17/16 380/278
2020/0125739 A1* 4/2020 Verma .................... H04L 9/008
(Continued)

FOREIGN PATENT DOCUMENTS

CN 111027632 A 4/2020

OTHER PUBLICATIONS

Al Badawi, Ahmad et al.; "Implementation and Performance Evaluation of RNS Variants of the BFV Homomorphic Encryption Scheme"; *IEEE Transactions on Emerging Topics in Computing*; Dec. 5, 2018; pp. 1-20; vol. 9, No. 2; IEEE; Piscataway, NJ, USA.
(Continued)

*Primary Examiner* — Maung T Lwin
(74) *Attorney, Agent, or Firm* — Leydig, Voit & Mayer, Ltd.

(57) ABSTRACT

A method training an artificial neural network (ANN) on a remote host computes, using a trusted process deployed in a trusted execution environment (TEE) on the remote host, a key-pair for a homomorphic encryption scheme and shares, by the trusted process, the public key (PK) of the key-pair with an untrusted process deployed on the remote host. The method splits the training procedure of the ANN between the untrusted process and the trusted process, wherein the untrusted process computes encrypted inputs to neurons of the ANN by means of the homomorphic encryption scheme, while the trusted process computes outputs of the neurons based on the respective encrypted inputs to the neurons as provided by the untrusted process.

15 Claims, 2 Drawing Sheets

110
$150_1$ Data owner 1
$150_2$ Data owner 2
160 Model owner
Encrypted data
Encrypted data
Trained model
Computing Platform
120 TEE Trusted Process 130
ANN Training
170 UPS Untrusted Process 140

(51) Int. Cl.
*H04L 9/00* (2022.01)
*H04L 9/30* (2006.01)

(56) References Cited

U.S. PATENT DOCUMENTS

| | | | | |
|---|---|---|---|---|
| 2020/0204341 | A1* | 6/2020 | Williams | G06N 3/08 |
| 2020/0252198 | A1* | 8/2020 | Nandakumar | G06N 3/084 |
| 2020/0366459 | A1* | 11/2020 | Nandakumar | G06F 21/602 |
| 2022/0271914 | A1* | 8/2022 | Diallo | H04L 9/0825 |

OTHER PUBLICATIONS

Albrecht, Martin et al.; "Homomorphic Encryption Standard"; *Technical Report*; Nov. 21, 2018; pp. 1-33; paper 2019/939; Cryptology ePrint Archive, International Association for Cryptologic Research (IACR); Bellevue, WA, USA.

Catalano, Dario et al.; "Boosting Linearly-Homomorphic Encryption to Evaluate Degree-2 Functions on Encrypted Data"; *Proceedings of the 22nd ACM Conference on Computer and Communications Security*, Oct. 12, 2015; pp. 1-28; ACM Publications; New York, NY, USA.

Hynes, Nick et al.; "Efficient Deep Learning on Multi-Source Private Data"; *Computer Science—Machine Learning*; Jul. 17, 2018; pp. 1-8; vol. 1; XP081249732; ArXiv.org, Cornell University; Ithaca, NY, USA.

Ryffel, Théo et al.; "Partially Encrypted Machine Learning using Functional Encryption"; *Proceedings of the 33rd International Conference on Neural Information Processing Systems*; Oct. 22, 2019; pp. 1-22; vol. 4, No. 406; XP081502784; ArXiv.org, Cornell University; Ithaca, NY, USA.

Sav, Sinem et al.; "Poseidon: Privacy-Preserving Federated Neural Network Learning"; *Network and Distributed Systems Security Symposium* (*NDSS*) 2021; Sep. 1, 2020; pp. 1-24; vol. 1; XP081753268; ArXiv.org, Cornell University; Ithaca, NY, USA.

Tramer, Florian et al.; "Slalom: Fast, Verifiable and Private Execution of Neural Networks in Trusted Hardware"; *2019 International Conference on Learning Representations*; Feb. 27, 2019; pp. 1-19; vol. 2; ArXiv.org, Cornell University; Ithaca, NY, USA.

* cited by examiner

PRIVATE ARTIFICIAL NEURAL NETWORKS WITH TRUSTED EXECUTION ENVIRONMENTS AND QUADRATIC HOMOMORPHIC ENCRYPTION

CROSS REFERENCE TO RELATED APPLICATIONS

This application is a U.S. National Phase application under 35 U.S.C. § 371 of International Application No. PCT/EP2021/063353, filed on May 19, 2021, and claims benefit to European Patent Application No. EP 21164884.5, filed on Mar. 25, 2021. The International Application was published in English on Sep. 29, 2022 as WO 2022/199861 A1 under PCT Article 21 (2).

FIELD

The present invention relates to a computer-implemented method of training an artificial neural network, ANN, on a remote host, as well as to a host processing system for remote training of an artificial neural network.

BACKGROUND

Artificial Neural Networks (ANN) enable a wide range of data mining applications. On the one hand, the resources required to train an ANN make the task particularly suited for resources-rich cloud deployments; on the other hand, the sensitivity of data used to train an ANN may not allow the data owner to share data with a cloud provider.

Generally, Trusted Execution Environments (TEEs) are a promising solution in application scenarios where arbitrary computation on sensitive data is outsourced to a remote party that is not trusted with cleartext access to the data.

Nevertheless, TEEs are ill-suited for ANNs because of the resource constraints that current hardware architectures impose on TEEs. For example, Intel SGX—arguably the most popular TEE for workstations—imposes a limit on the memory available to a TEE, thereby preventing resource-demanding computations such as ANN training. Further, TEEs like Intel SGX run on the main processor and, therefore, cannot leverage dedicated hardware architectures (e.g., FPGAs or GPUs) that can sensibly speedup ANN training.

Alternatively, Homomorphic Encryption (HE) allows a party to compute over encrypted data and could be used to train ANNs in the cloud. Nevertheless, the complexity of HE when evaluating functions such as ANNs over encrypted data result in an intolerable performance overhead if compared to the same task on cleartext data. Further, HE is not suited to compute many of the activation functions used in ANNs; prior art resorts to specific activation functions or to polynomial approximation which provide sub-optimal results.

SUMMARY

In an embodiment, the present disclosure provides a method of training an artificial neural network (ANN) on a remote host. The method computes, using a trusted process deployed in a trusted execution environment (TEE) on the remote host, a key-pair for a homomorphic encryption scheme and shares, by the trusted process, the public key (PK) of the key-pair with an untrusted process deployed on the remote host. The method splits the training procedure of the ANN between the untrusted process and the trusted process, wherein the untrusted process computes encrypted inputs to neurons of the ANN by means of the homomorphic encryption scheme, while the trusted process computes outputs of the neurons based on the respective encrypted inputs to the neurons as provided by the untrusted process.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
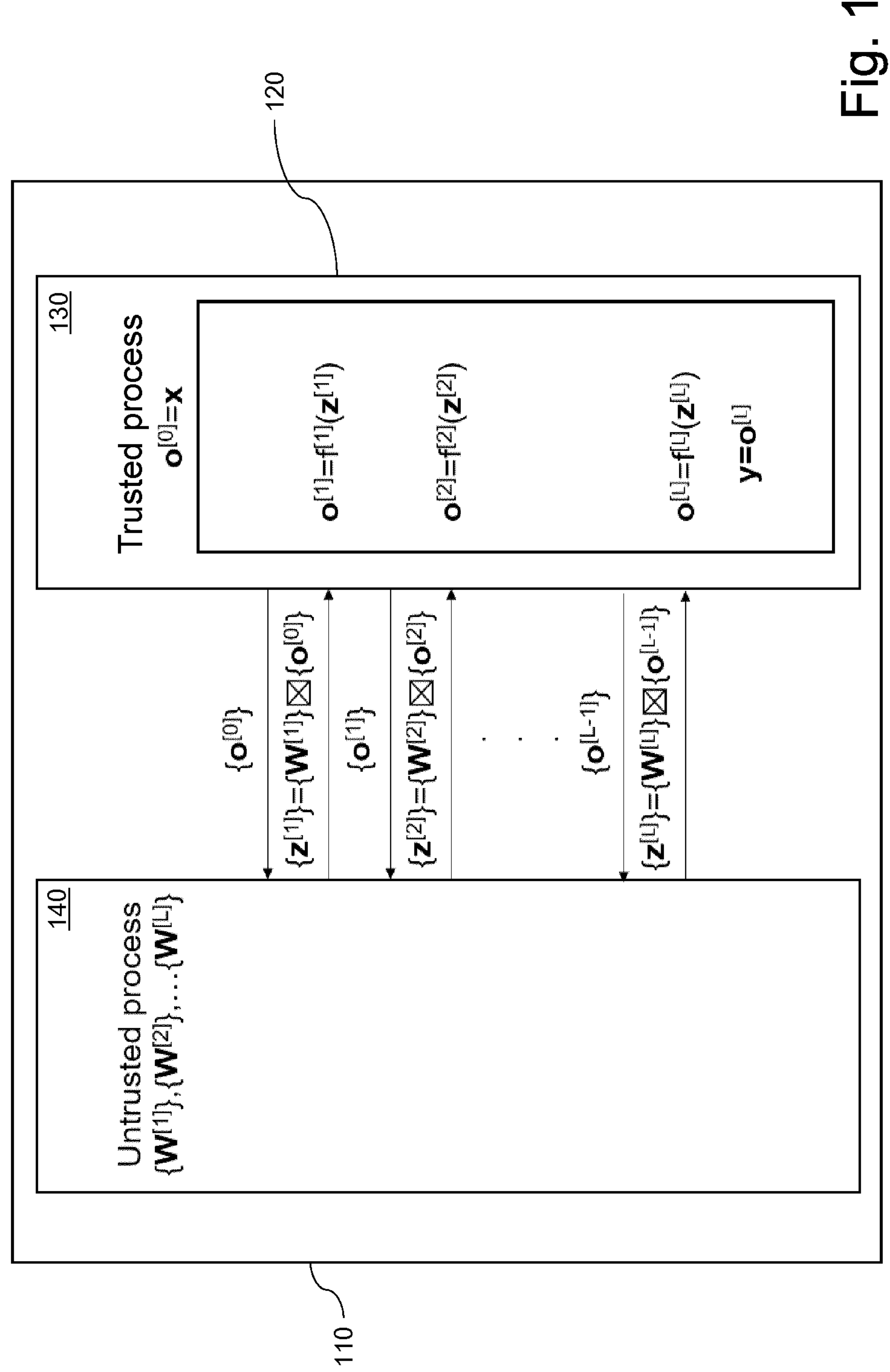
FIG. 1 is a schematic view providing an overview of a feed-forwarding phase used both during training and during interference in accordance with an embodiment of the present invention.

In accordance with an embodiment, the present invention improves and further develops a method and a host processing system of the initially described type for training an artificial neural network in such a way that a high level of accuracy of the ANN training is achieved, while at the same time the privacy of the data used to train the ANN is preserved.

In accordance with another embodiment, the present invention provides a computer-implemented method of training an artificial neural network, ANN, on a remote host, the method comprising: computing, by a trusted process deployed in a trusted execution environment, TEE, on the remote host, a key-pair for a homomorphic encryption scheme and sharing, by the trusted process, the public key, PK, of the key-pair with an untrusted process deployed on the remote host; and splitting the training procedure of the ANN between the untrusted process and the trusted process, wherein the untrusted process computes encrypted inputs to the neurons of the ANN by means of the homomorphic encryption scheme, while the trusted process computes the outputs of the neurons based on the respective encrypted neuron inputs as provided by the untrusted process.

According to a further embodiment, the present invention provides a host processing system for remote training of an artificial neural network, the host processing system comprising a trusted execution environment, TEE, and an untrusted processing system, UPS and being configured to run a trusted process deployed in the TEE that computes a key-pair for a homomorphic encryption scheme and share the public key, PK, of the key-pair with an untrusted process running on the UPS; and to split the training procedure of the ANN between the untrusted process and the trusted process, wherein the untrusted process is configured to compute encrypted inputs to the neurons of the ANN by means of the homomorphic encryption scheme, while the trusted process is configured to the outputs of the neurons based on the respective encrypted neuron inputs as provided by the untrusted process.

According to an embodiment, the present invention enables training an artificial neural network on a remote host, while keeping the network model and the train data hidden from any software running on the host. According to embodiment of the invention, this is achieved by carefully combining trusted execution environments and homomorphic encryption. By using a homomorphic encryption, embodiments of the invention achieve managing ANN training data in a privacy preserving way, without having to introduce mathematical approximations into the training process, for instance an approximation of the activation function with polynomials.

More specifically, embodiments of the invention leverage TEE and quadratic homomorphic encryption to train ANNs on hosts where no software is trusted with cleartext access to data—be it the training data or the ANN parameters. The main idea is to split the computation between an untrusted system component that handles encrypted data, and a trusted TEE that computes on cleartext data. Previous work (for reference, see F. Tramèr, D. Boneh: "Slalom: Fast, Verifiable and Private Execution of Neural Networks", in Trusted Hardware, ICLR 2019) has explored a design paradigm to split ANN computation between a trusted processor and an untrusted one, but it is limited to inference and does not address training of the network.

According to an embodiment of the invention, it may be provided that the homomorphic encryption scheme is parametrized to compute quadratic functions. In this context, it has been recognized that such homomorphic encryption scheme performs significantly better than those schemes parametrized to compute functions of degree greater than two.

According to an embodiment of the invention, the trusted process running in the TEE may be configured to encrypt, by using the public key PK of the key-pair computed for the homomorphic encryption scheme, the inputs and the parameters, including the weights, of the ANN. The trusted process may then transmit the encrypted inputs and parameters to the untrusted process. Furthermore, the trusted process may be configured to compute, by cooperating with the untrusted process, the output of the ANN and the gradient of the weights, given the encrypted inputs and the encrypted weights.

According to an embodiment of the invention, the method may comprise an initialization phase, in which the trusted process computes random weight matrices for all layers of the ANN, encrypts the random weight matrices with the public key, PK, and sends the encrypted weight matrices to the untrusted process.

According to an embodiment of the invention, the method may comprise a feed-forwarding phase, in which the trusted process sends, for each layer of the ANN, the output of the neurons of a respective layer, encrypted with the public key, PK, to the untrusted process. On the other hand, the untrusted process may be configured to compute an input for the respective subsequent layer of the ANN by executing homomorphic matrix multiplication of the respective encrypted weight matrix and the encrypted output as received from the trusted process. In an embodiment, homomorphic matrix multiplication may be achieved by means of homomorphic addition and multiplication According to an embodiment, the feed-forwarding phase may include the additional steps of decrypting, by the trusted process, the input for the respective subsequent layer of the ANN as received from the untrusted process, and computing, by the trusted process, an output of the respective subsequent layer by computing on the decrypted input the respective activation function. For the last layer of the ANN, the trusted process may define the calculated output as the output vector of the ANN. Based on this output vector and the correct output vector, the trusted process may calculate the cost function. Consequently, at the end of the feed-forwarding phase, the TEE holds input and output vectors for each layer of the ANN as well as the cost function.

According to an embodiment, the method may comprise a back-propagation phase for minimizing the cost function of the ANN by adjusting the weights. In the back-propagation phase, the trusted process may compute, for each layer of the ANN, a gradient of the weights. Furthermore, the trusted process may encrypt the gradients with the public key, PK, and send the encrypted gradients to the untrusted process. At the end of the propagation phase, the untrusted process may hold, for each layer of the ANN, a gradient weight matrix, encrypted with the public key, PK.

According to an embodiment of the invention, the method may further comprise a weights-updating phase, in which the untrusted process computes, based on the encrypted weight matrices and gradient weight matrices, updated weight matrices by executing, for each layer of the ANN, homomorphic matrix addition of the respective encrypted weight matrix and the respective encrypted gradient weight matrix.

According to an embodiment, after the initialization phase, the method may be configured to iterate the feed-forwarding phase, the back-propagation phase and the weights-updating phase over each sample of an ANN training data set. At each iteration, a different pair of the training data (consisting of an input vector and a corresponding correct output vector) may be considered.

According to an embodiment of the invention, the method may comprise a weight refreshing procedure, in which the untrusted process sends the encrypted weight matrices of each layer of the ANN to the trusted process and discards them afterwards. On the other hand, the trust process may decrypt the encrypted weight matrices received from the untrusted process to obtain the plaintext weight matrices and may encrypt each plaintext weight matrix in a fresh ciphertext. The trusted process may then send the refreshed encrypted weight matrices to the untrusted process.

According to an embodiment, the weight refreshing procedure may be executed in case the number of weight updates reaches an upper bound as defined by the parameters of the homomorphic encryption scheme.

According to an embodiment, the ANN training data are provided, encrypted under the public key, PK, of the trusted process and, thus, in a privacy-preserving fashion, by a plurality of different data owners. According to an embodiment, the trained model may be provided to a model owner, which may be a different entity or the same entity as any of the data owners.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

The present invention enables training an artificial neural network on a remote computing platform, while keeping the network model and the training data hidden from any software running on the platform. This is achieved by combining trusted execution environments, TEEs, and homomorphic encryption.

According to an embodiment, the present invention provides a method for private inference and training of an Artificial Neural Network, wherein the method may comprise the steps of 1) Deploying a trusted process in a trusted execution environment and an untrusted process on the same host.
2) Computing, by the trusted process a key-pair for a quadratic homomorphic encryption scheme and sending, by the trusted process, the public key to the untrusted process.
3) Encrypting, by the trusted process, the inputs and the parameters, including the weights, of the artificial neural networks.
4) Computing, by the trusted process cooperating with the untrusted process, the output of the neural networks and the gradient of the weights, given the encrypted inputs and the encrypted weights. In particular, the untrusted process computes encrypted neuron input and the trusted processors uses such input to compute the neuron outputs.

Before providing details of the present invention, the fundamental functionalities and the mathematical principles of both homomorphic encryption schemes and artificial neural networks will be described, although, in general, it is assumed that those skilled in the art are sufficiently familiar with these aspects.

Homomorphic Encryption

Homomorphic Encryption (HE) enables computation over encrypted data by defining two main operation denoted as homomorphic multiplication "$\otimes$" and homomorphic addition "$\oplus$". Let $\{x\}$ denote a ciphertext encrypting value x (under a specified public key). Thus, $\{a\}\otimes\{b\}=\{a*b\}$ and $\{a\}\oplus\{b\}=\{a+b\}$.

A quadratic homomorphic encryption scheme is one that allows arbitrary additions and one multiplication (followed by arbitrary additions) on encrypted data. This property allows the evaluation of multi-variate polynomials of degree 2 on encrypted values. Quadratic homomorphic encryption schemes are available in literature. Some of these schemes are obtained either by extending techniques typically used in the context of linearly-homomorphic encryption (as described, e.g., in D. Catalano, D. Fiore: "Boosting Linearly-Homomorphic Encryption to Evaluate Degree-2 Functions on Encrypted Data", ACM CCS 2015, which in its entirety is hereby incorporated herein by reference), or by scaling down a fully homomorphic encryption scheme (as described, e.g., in M. Albrecht et al.: "Homomorphic Encryption Security Standard", Technical report, https://homomorphicencryption.org/, which in its entirety is hereby incorporated herein by reference). It should be noted that the homomorphic encryption scheme described in the latter citation is one where the number of additions and multiplications is not bounded.

It is noted, however, that all fully homomorphic encryption schemes add a so-called "noise" during plaintext encryption. This noise grows every time a ciphertext is used in a computation, and if the noise exceeds a pre-defined threshold, decryption fails. The noise threshold is determined by the HE parameters and it has a direct impact on the length of the ciphertexts and the complexity of the homomorphic operations. In a nutshell, performance of an homomorphic encryption scheme parametrized to compute quadratic functions are appreciably better than those of the same scheme parametrized to compute functions of degree greater than two.

Artificial Neural Networks

In general and in particular as understood in the context of the present disclosure, an Artificial Neural Network (hereinafter sometimes briefly referred to as ANN) maps an input vector x to an output vector y through a series of transformations partitioned in L+1 layers, each made of several neurons. The first layer, denoted as layer 0, corresponds to the input and has one neuron per element of x; the last layer, denoted as layer L, corresponds to the output and has one neuron per element of y. The input to each neuron, in any layer but the first layer, is a weighted sum of the output of the neurons in the previous layer. Let $o_i^{[\ell]}$ denote the output of the i-th neuron at layer $\ell$, then the input to the j-th neuron at layer $\ell+1$ is $$z_j^{[\ell+1]} = \sum_{i=1}^{n[\ell]} w_{ij}^{[\ell]} o_i^{[\ell]}$$

where $n^{[\ell]}$ is the number of neurons at layer $\ell$. The output of each neuron, in any layer but the first layer, is computed by applying a so-called activation function to its input. Hence $o_i^{[\ell]}=f^{[\ell]}(z_i^{[\ell]})$ where $f^{[\ell]}$ is the activation function for the neurons at layer $\ell$.

As such, the output of the network over a specific input x is computed as $$y = f^{[L]}(W^{[L-1]} \cdot f^{[L-1]}(W^{[L-1]} \ldots \cdot f^{[1]}(W^{[1]} \cdot x) \ldots )),$$

where $W^{[\ell]}$ is the matrix of weights that determine the inputs of neurons at layer $\ell+1$, given the outputs of neurons at layer $\ell$, and "·" denotes matrix multiplication.

Training an ANN may require a set of pairs $\{x_i,exp_i\}_{i=1, \ldots, n}$, where n denotes the number of training samples, and where for each input $x_i$, the corresponding $exp_i$ represents the expected value to be output by the network. Initially, the weights matrices are initialized with random values. Given $\{x_i,exp_i\}_{i=1, \ldots, n}$ a "feed-forward" phase computes the output of the network, say $y_i$. A "back-propagation" evaluates the network error by comparing the network output $y_i$ with the expected output $exp_i$, and determines how to adjust weights, so to minimize the error.

During the feed-forward phase, the output of each neuron is computed layer by layer. That is, let $o^{[0]}=x$, then the output of neurons at layer 1 is computed as $o^{[1]}=f^{[1]}(W^{[1]}\cdot o^{[0]})$; next, the output of neurons at layer 2 is computed as $o^{[2]}=f^{[2]}(W^{[2]}\cdot o^{[1]})$, and so forth, until computing the output of neurons in the last layer as $y=f^{[L]}(W^{[L]}\cdot o^{[L-1]})$.

Given an input x, the corresponding network output y, and the correct output exp, a cost function C(exp,y) provides a quantitative measure of the error of the output produced by the network on input x. A cost function could also be defined over n' pairs $\{exp_i,y_i\}_{i=1, \ldots, n'}$.

Back-propagation enables minimizing the cost function C(exp,y), by adjusting the weights in $\{W^{[\ell]}\}_{i=1, \ldots, L}$.

Let $(f^{[\ell]})'$ denote the vector of derivatives of the activation function at layer $\ell$, computed at $z^{[\ell]}=W^{[\ell]}\cdot o^{[\ell-1]}$. Also, let $\delta^{[L]}=(f^{[L]})'*C(exp,y)$ and define $\delta^{[\ell+1]}=(f^{[\ell-1]})'*(W^{[\ell]})^T \delta^{[\ell]}$ for $\ell<L$. It should be noted that $\delta^{[\ell]}$ is a vector that has as many elements as the number of neurons at layer $\ell$, and that "*" denotes element-wise multiplication.

The gradient of the weights at layer $\ell$ can be computed as $\Delta(\mathbf{W}^{[\ell]})=\boldsymbol{\delta}^{[\ell]}*(\mathbf{o}^{[\ell-1]})^T$. Hence, the new weight matrix for layer $\ell$ is computed as $\mathbf{W}^{[\ell]}-\Delta(\mathbf{W}^{[\ell]})$.

According to an embodiment of the invention, the ANN training may be performed by splitting the training process into a trusted process T running in a TEE implemented on a computing platform, and an untrusted process U running outside of the TEE (e.g., a regular application) on the same computing platform.

FIG. 1 schematically illustrates the execution of a feed-forwarding procedure according to an embodiment of the invention. Specifically, FIG. 1 shows a remote host or computing platform 110, where the trusted process T, assigned reference number 130 in FIG. 1, runs in a trusted execution environment, TEE 120, deployed on the remote computing platform 110. In addition, the untrusted process U, assigned reference number 140 in FIG. 1, runs on the same computing platform 110, however, outside of the TEE 120.

The TEE 120 may be configured to generate a key pair PK, SK (public key, secret key) for a quadratic homomorphic encryption scheme and shares PK with U. With regard to the quadratic homomorphic encryption scheme, the encryption of x under a specific public key is denoted with {x}, and "⊕" and "⊗" denote homomorphic addition and multiplication, respectively. The notation {a} is used to denote message "a" encrypted with public key PK; all encryption operation use PK as the public encryption key and all decryption operations use SK as the private decryption key. Also, the trusted process T holds data for training of the ANN, e.g., a set of pairs $(x_i,exp_i)$, for i=1, . . . , n.

According to an embodiment of the invention, the method for training the ANN includes an initialization step. In this regard, it may be provided that the trusted process T computes random weight matrices $W^{[1]}, \ldots, W^{[L]}$, encrypts them with the secret key SK generated for the quadratic homomorphic encryption scheme, and sends $\{W^{[1]}\}, \ldots, \{W^{[L]}\}$ to the untrusted process U. Those encrypted matrices may be used by U in the remaining procedures.

According to an embodiment, after initialization, network training may be performed by iterating through three procedures, namely (i) feed-forwarding, (ii) back-propagation, and (iii) weight-updating, over each pair $(x_i,exp_i)$, for i=1, . . . , n. At each iteration, a different pair {x,exp} is considered, wherein x is denoted as $o^{[0]}$. Hereinafter, the three procedures will be described in more detail.

According to an embodiment of the invention, the feed-forwarding procedure may include the following steps that are repeated for each of the layers $\ell$=1, . . . , L of the ANN, as shown in FIG. 1:

1. T sends $\{\mathbf{o}^{[\ell-1]}\}$ to U
2. U computes $\{\mathbf{z}^{[\ell]}\}=\{\mathbf{W}^{[\ell]}\}\{\mathbf{o}^{[\ell-1]}\}$ and sends it to T. Note that "⊠" denotes homomorphic matrix multiplication and it is achieved by means of homomorphic addition and multiplication.
3. T decrypts $\{\mathbf{z}^{[\ell]}\}$ and computes $\mathbf{o}^{[\ell]}=f^{[\ell]}(\mathbf{z}^{[\ell]})$
4. If $\ell$=L, then T sets y=$\mathbf{o}^{[\ell]}$, computes C(exp,y) and stops.

Accordingly, at the end of the feed-forwarding phase, the trusted process 130 running on TEE 120 holds $x=o^{[0]}$, $z^{[1]}$, $o^{[1]}$, . . . , $z^{[L-1]}$, $o^{[L-1]}$, $z^{[L]}$, $o^{[L]}$=y and C(exp,y).

FIG. 1 provides an overview of the feed-forwarding phase, as described above. According to embodiments, the illustrated feed-forwarding procedure is used both during training and during inference. FIG. 1 also shows that the TEE 120 has to decrypt, process and re-encrypt a number of inputs that amount to the number of neurons in the network. The performance gain, compared to a solution that runs the whole ANN training with an untrusted processor using a fully homomorphic encryption scheme, is given by the fact that encryption/decryption complexity is negligible compared to the complexity of homomorphic operations (as has been demonstrated in A. Qaisar et al.: "Implementation and Performance Evaluation of RNS Variants of the BFV Homomorphic Encryption Scheme", in IEEE Transactions on Emerging Topics in Computing, doi: 10.1109/TETC.2019.2902799).

According to an embodiment of the invention, the back-propagation procedure may include the following steps:

First, T computes $\delta^{[L]}=f'(z^{[L]})*C(exp,y)$ and $\Delta(W^{[L]})=\delta^{[L]}*(\mathbf{o}^{[\ell-1]})^T$; it encrypts the values using the secret key SK and sends the encrypted values $\{\delta^{[L]}\}$, $\{\Delta(W^{[L]})\}$ to U.

Next, the following steps may be repeated for each of the layers $\ell$=1, . . . , L of the ANN:

1. U computes $\{\boldsymbol{\lambda}^{[\ell]}\}=\{\mathbf{W}^{[\ell]}\}^T ⊠ \{\boldsymbol{\delta}^{[\ell+1]}\}$ and sends it to T
2. T decrypts $\{\boldsymbol{\lambda}^{[\ell]}\}$, and computes $\boldsymbol{\delta}^{[\ell]}=f'(\mathbf{z}^{[\ell]})*\boldsymbol{\lambda}^{[\ell]}$ and $\Delta(\mathbf{W}^{[\ell]})-\boldsymbol{\delta}^{[\ell]}*(\mathbf{o}^{[\ell-1]})^T$; then, it sends $\{\boldsymbol{\delta}^{[\ell]}\}$, $\{\Delta(\mathbf{W}^{[\ell]})\}$ to U Accordingly, at the end of the back-propagation phase, U holds $\{\Delta(W^{[1]})\}, \ldots, \{\Delta(W^{[L]})\}$.

According to an embodiment of the invention, the weight-updating procedure may include the following steps:

Given weight matrices $\{W^{[1]}\}, \ldots, \{W^{[L]}\}$ and the gradients $\{\Delta(W^{[1]})\}, \ldots, \{\Delta(W^{[L]})\}$, U may perform the following step for each of the layers $\ell$=1, . . . , L of the ANN:

1. $\{\mathbf{W}^{[\ell]}\}=\{\mathbf{W}^{[\ell]}\}\oplus\{\Delta(\mathbf{W}^{[\ell]})\}$ According to an embodiment of the invention, network training may also include a weight refresh procedure. In case the quadratic homomorphic encryption scheme is instantiated with a generic homomorphic encryption scheme, the number of homomorphic additions, and thus, the number of weight updates is upper-bounded by the parameters of the scheme. Therefore, once this bound is reached, the weight matrices may be refreshed by executing, repeated for each of the layers $\ell$=1, . . . , L of the ANN, the steps as follows:

1. U sends $\{\mathbf{W}^{[\ell]}\}$ to T and discards it
2. T decrypts $\{\mathbf{W}^{[\ell]}\}$ to obtain $\mathbf{W}^{[\ell]}$ and encrypts the plaintext matrix in a fresh ciphertext $\{\mathbf{W}^{[\ell]}\}$; the latter is sent to U.

Consequently, at the end of the weight refresh phase, U holds fresh weight matrices $\{W^{[1]}\}, \ldots, \{W^{[L]}\}$.

Figure 2:
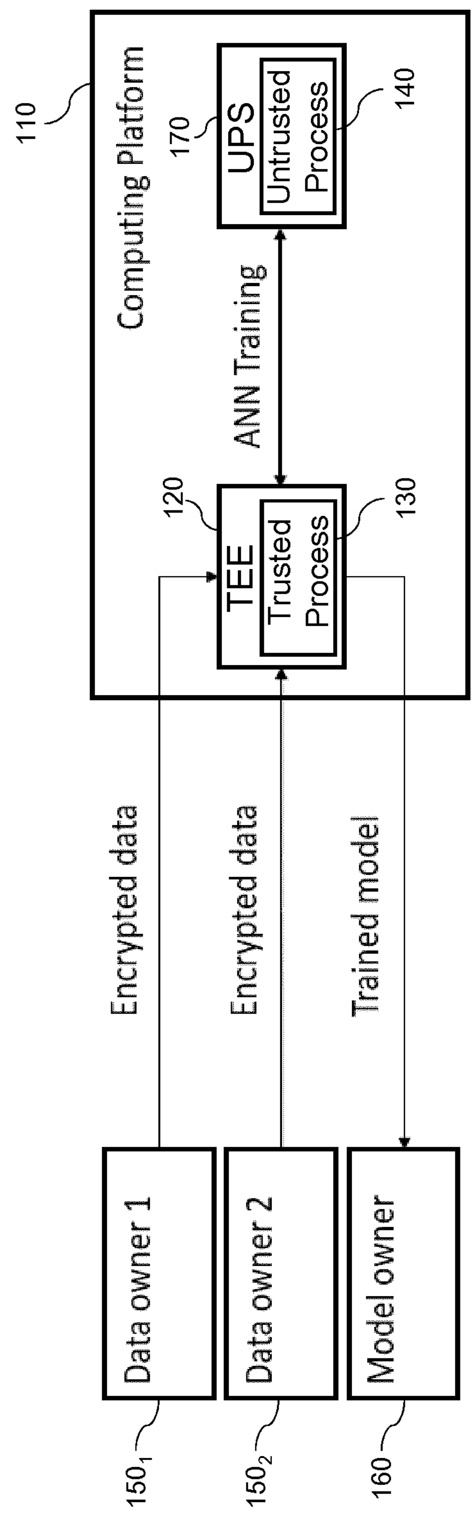
FIG. 2 is a schematic view illustrating a system model for training an artificial neural network on a remote computing platform in accordance with an embodiment of the present invention.

FIG. 2, in which like components and functions are denoted with like reference numbers as in FIG. 1, schematically illustrates an embodiment of the present invention, where a method of training an artificial neural network, ANN, is executed in a system where two data owners 1501, 1502 encrypt their data under the public key of a trusted process 130 running in a TEE 120 on a remote computing platform 110. The latter carries out the training of the ANN, by cooperating with an untrusted process 140 running on an untrusted processing system, UPS 170, implemented on the computing platform 110 as explained in connection with FIG. 1, and provides the trained model to a model owner 160. It should be noted that the number of data owners is not restricted to 2, i.e. the trusted process 130 running in the TEE 120 may be configured to process encrypted data received from a plurality of data owners. Furthermore, it should be noted that a data owner 1501, 1502 may also act as model owner 160 and receive the trained model.

According to embodiments of the invention, the remote host including the TEE 120 and UPS 170, e.g. the computing platform 110 shown in FIG. 2, should be understood to be a processing system in accordance with embodiments of the present invention. As will be appreciated by those skilled in the art, the processing system may include one or more processors, such as a central processing unit (CPU) of a computing device or a distributed processor system. The processors execute processor-executable instructions for performing the functions and methods described herein. In embodiments, the processor executable instructions are locally stored or remotely stored and accessed from a non-transitory computer readable medium, which may be a hard drive, cloud storage, flash drive, etc. A read-only memory may include processor-executable instructions for initializing the processors, while a random-access memory (RAM) may be the main memory for loading and processing instructions executed by the processors. A network interface may connect to a wired network or cellular network and to a local area network or wide area network, such as the Internet, and may be used to receive and/or transmit data, including ANN training datasets such as datasets representing one or more images. The processing system may be embodied in smartphones, tablets, servers or other types of computer devices. The processing system, which can be connected alone or with other devices to a bus, can be used to implement the protocols, devices, mechanisms, systems and methods described herein.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

The invention claimed is:

1. A computer-implemented method of training an artificial neural network (ANN) on a remote host, the method comprising:

computing, by a trusted process deployed in a trusted execution environment (TEE) on the remote host, a key-pair for a homomorphic encryption scheme and sharing, by the trusted process, the public key (PK) of the key-pair with an untrusted process deployed on the remote host; and splitting the training procedure of the ANN between the untrusted process and the trusted process, wherein the untrusted process computes encrypted inputs to neurons of the ANN by means of the homomorphic encryption scheme, while the trusted process computes outputs of the neurons based on the respective encrypted inputs to the neurons as provided by the untrusted process.

2. The method according to claim 1, wherein the homomorphic encryption scheme is parametrized to compute quadratic functions.

3. The method according to claim 1, further comprising:

encrypting, by the trusted process, the inputs and the parameters, including the weights, of the ANN with the public key (PK);

sending the encrypted inputs and parameters to the untrusted process; and computing, by the trusted process cooperating with the untrusted process, an output of the ANN and a gradient of the weights, given the encrypted inputs and the encrypted weights.

4. The method according to claim 1, further comprising an initialization phase, wherein the initialization phrase comprises:

computing, by the trusted process, random weight matrices for all layers of the ANN;

encrypting the random weight matrices with the public key (PK); and sending the encrypted weight matrices to the untrusted process.

5. The method according to claim 1, further comprising a feed-forwarding phase, the feed-forward phrase comprising:

sending, by the trusted process for each layer of the ANN, the output of the neurons of a respective layer, encrypted with the public key (PK), to the untrusted process; and computing, by the untrusted process, an input for the respective subsequent layer of the ANN by executing homomorphic matrix multiplication of the respective encrypted weight matrix and the encrypted output as received from the trusted process.

6. The method according to claim 5, further comprising:

decrypting, by the trusted process, the input for the respective subsequent layer of the ANN as received from the untrusted process; and computing, by the trusted process, an output of the respective subsequent layer by computing on the decrypted input the respective activation function.

7. The method according to claim 5, further comprising:

iterating the feed-forwarding phase, the back-propagation phase and the weights-updating phase over each sample of an ANN training data set.

8. The method according to claim 1, further comprising a back-propagation phase for minimizing the cost function of the ANN by adjusting the weights, the back-propagation phase comprising:

computing, by the trusted process for each layer of the ANN, a gradient of the weights; and encrypting the gradients with the public key (PK) and sending the encrypted gradients to the untrusted process.

9. The method according to claim 8, wherein, at the end of the propagation phase, the untrusted process holds, for each layer of the ANN, a gradient weight matrix, encrypted with the public key (PK).

10. The method according to claim 9, further comprising a weights-updating phase, the weights-updating phase comprising:

computing, by the untrusted process, based on the encrypted weight matrices and gradient weight matrices, updated weight matrices by executing, for each layer of the ANN, homomorphic matrix addition of the respective encrypted weight matrix and the respective encrypted gradient weight matrix.

11. The method according to claim 1, further comprising a weight refreshing procedure, the weight refreshing procedure comprising:

sending, by the untrusted process, encrypted weight matrices of each layer of the ANN to the trusted process and discarding them afterwards;

decrypting, by the trusted process, the received encrypted weight matrices to obtain the plaintext weight matrices and encrypting each plaintext weight matrix in a fresh ciphertext; and sending, by the trusted process, the refreshed encrypted weight matrices to the untrusted process.

12. The method according to claim 11, wherein the weight refreshing procedure is executed in case a number of weight updates reaches an upper bound as defined by parameters of the homomorphic encryption scheme.

13. The method according to claim 1, wherein the ANN training data are provided, encrypted under the public key (PK) of the trusted process, by a plurality of different data owners.

14. A host processing system for remote training of an artificial neural network, the host processing system comprising a trusted execution environment (TEE) and an untrusted processing system (UPS) and being configured to:

run a trusted process deployed in the TEE that computes a key-pair for a homomorphic encryption scheme and share the public key (PK) of the key-pair with an untrusted process running on the UPS; and split the training procedure of the ANN between the untrusted process and the trusted process, wherein the untrusted process is configured to compute encrypted inputs to the neurons of the ANN by means of the homomorphic encryption scheme, while the trusted process is configured to compute outputs of the neurons based on the respective encrypted inputs to the neurons as provided by the untrusted process.

15. A non-transitory computer readable medium for remote training of an artificial neural network with a host processing system comprising a trusted execution environment (TEE), and an untrusted processing system (UPS) the medium comprising program code for configuring the host processing system to:

run a trusted process deployed in the TEE that computes a key-pair for a homomorphic encryption scheme and share the public key (PK) of the key-pair with an untrusted process running on the UPS; and split the training procedure of the ANN between the untrusted process and the trusted process, wherein the untrusted process is configured to compute encrypted inputs to neurons of the ANN by means of the homomorphic encryption scheme, while the trusted process is configured to compute outputs of the neurons based on the respective encrypted inputs to the neurons as provided by the untrusted process.

* * * * *